US012077352B2

(12) United States Patent
Shaffer

(10) Patent No.: US 12,077,352 B2

(45) Date of Patent: Sep. 3, 2024

(54) ONE PIECE CONVERTIBLE PACKAGES AND DISPLAY SYSTEMS

(71) Applicant: WestRock Shared Services, LLC, Atlanta, GA (US)

(72) Inventor: Douglas Shaffer, Winston Salem, NC (US)

(73) Assignee: WestRock Shared Services, LLC, Atlanta, GA (US)

( * ) Notice: Subject to any disclaimer, the term of this patent is extended or adjusted under 35 U.S.C. 154(b) by 266 days.

(21) Appl. No.: 16/449,678

(22) Filed: Jun. 24, 2019

(65) Prior Publication Data

US 2020/0002048 A1 Jan. 2, 2020

Related U.S. Application Data

(60) Provisional application No. 62/691,931, filed on Jun. 29, 2018.

(51) Int. Cl.

*B65D 5/20* (2006.01)
*B31B 50/20* (2017.01)
*B31B 50/26* (2017.01)
*B31B 50/62* (2017.01)
*B31B 50/73* (2017.01)
*B31B 110/35* (2017.01)
*B31B 120/30* (2017.01)
*B65D 5/42* (2006.01)

(52) U.S. Cl.

CPC ............ *B65D 5/2052* (2013.01); *B31B 50/26* (2017.08); *B31B 50/624* (2017.08); *B31B 50/732* (2017.08); *B65D 5/4266* (2013.01); *B31B 50/20* (2017.08); *B31B 2110/35* (2017.08); *B31B 2120/302* (2017.08)

(58) Field of Classification Search

CPC .... B65D 5/2052; B65D 5/2466; B65D 5/422; B65D 5/509; B65D 5/5007; B65D 5/4237; B65D 27/00

USPC ...... 206/736–774, 45.25, 45.28, 45.2, 45.21, 206/45.23–45.26, 45.29

See application file for complete search history.

(56) References Cited

U.S. PATENT DOCUMENTS

| | | | | | |
|---|---|---|---|---|---|
| 2,107,999 | A * | 2/1938 | Friedel | B65D 5/18 | 206/766 |
| 2,799,391 | A * | 7/1957 | Eisner | B65D 5/422 | 281/31 |
| RE33,503 | E * | 12/1990 | Schluger | B65D 5/422 | 206/232 |

(Continued)

*Primary Examiner* — Chun Hoi Cheung

(74) *Attorney, Agent, or Firm* — Neil G. Cohen; Rohini K. Garg

(57) ABSTRACT

A package for a gravity feed rack display system that is shipped with product includes a plurality of panels connected together at fold lines configured for extending at least partially around an interior space. The plurality of panels includes a front panel, a back panel, a first side panel, a top panel, a second side panel and a bottom panel. The interior space is configured to receive at least one product. The package includes a first extension flap foldably connected to a first side of the front panel and a second extension flap foldably connected to a second side of the front panel. The plurality of panels and the first and second extension flaps define a first depth in a first position for shipping, and a second depth in a second position for display.

16 Claims, 19 Drawing Sheets

(56) References Cited

U.S. PATENT DOCUMENTS

| | | | | | |
|---|---|---|---|---|---|
| 5,232,087 | A * | 8/1993 | Schluger | B42D 15/045 | 206/232 |
| 6,070,719 | A * | 6/2000 | Pollock | B42D 15/04 | 206/232 |
| 6,527,111 | B2 * | 3/2003 | Leung | G11B 33/0494 | 40/725 |
| 6,868,964 | B2 * | 3/2005 | Carty | B65D 5/541 | 206/232 |
| 6,874,678 | B2 * | 4/2005 | Prokosch | B65D 5/10 | 229/122.1 |
| 7,578,393 | B2 * | 8/2009 | Gillon | B65D 5/4204 | 206/457 |
| 8,438,763 | B2 * | 5/2013 | Taylor | G09F 1/00 | 40/124.02 |
| 8,899,413 | B2 * | 12/2014 | Pruett | B65D 73/0078 | 206/232 |
| 10,800,598 | B1 * | 10/2020 | Kent | B65B 7/24 | |
| 2002/0070146 | A1 * | 6/2002 | Freeze | B65D 5/422 | 206/768 |
| 2004/0222127 | A1 * | 11/2004 | McLeod | B65D 5/4204 | 206/736 |
| 2008/0093258 | A1 * | 4/2008 | Kim | B65D 85/182 | 206/769 |
| 2010/0307933 | A1 * | 12/2010 | Nicholas | B65D 5/422 | 206/45.29 |
| 2013/0075302 | A1 * | 3/2013 | Bucknell | B65D 5/5206 | 206/765 |
| 2015/0021227 | A1 * | 1/2015 | Coon | B65D 5/304 | 229/175 |

* cited by examiner

ONE PIECE CONVERTIBLE PACKAGES AND DISPLAY SYSTEMS

REFERENCE TO RELATED APPLICATION

This application claims the benefit of priority under 35 u.s.c. § 119(e) of U.S. provisional application Ser. No. 62/691,931 filed on Jun. 29, 2018 which is hereby incorporated by reference in its entirety.

BACKGROUND OF THE INVENTION

Field of the Invention

The present disclosure relates to packaging such as for retail display, and more particularly to packaging with foldable side panels.

Description of Related Art

In retail settings, it is often desirable display goods for sale within their packaging. It is advantageous if the display packaging, can be used for shipping as well as for display in the retail setting. In packaging that ships with the goods within the package, it is desirable to have the packaging be compact and easy to use.

The conventional techniques have been considered satisfactory for their intended purpose. However, there is an ever present need for improved packaging. This disclosure provides a solution for this problem.

SUMMARY OF THE INVENTION

A package for a gravity feed rack display system that is shipped with product includes a plurality of panels connected together at fold lines configured for extending at least partially around an interior space. The plurality of panels includes a front panel, a back panel, a first side panel, a top panel, a second side panel and a bottom panel. The interior space is configured to receive at least one product. The package includes a first extension flap foldably connected to a first side of the front panel and a second extension flap foldably connected to a second side of the front panel. The plurality of panels and the first and second extension flaps define a first depth in a first position for shipping, and a second depth in a second position for display.

Each of the first and second extension flaps can be configured to be collapsed toward the front panel in the first position for shipping and folded back toward the back panel in the second position. Each of the first and second extension flaps can include a respective first panel and a respective second panel. The second panel can be foldably connected with respect to the first panel. A width of the first panel of the extension flap can be greater than a width the first side panel, and greater than a width of the second side panel. The first panel of each extension flap can be foldably connected to the front panel. In the first position, at least one of the extension flaps can overlay an exterior surface of the front panel. In the second position, the first and second extension flaps can be folded back with respect to the front panel.

In accordance with some embodiments, the top panel is foldably connected to an adhesive flap. At least one of the first side panel or the second side panel can include a respective side flap foldably connected thereto. The plurality of panels and the first and second extension flaps can be integrally formed.

In accordance with another aspect, a blank for a package includes a plurality of panels connected together at respective fold lines. The plurality of panels includes a front panel, a back panel, a first side panel, a top panel, a second side panel and a bottom panel. The blank includes first and second extension flaps connected to the front panel at respective fold lines. The plurality of panels and the first and second extension flaps are configured to define a first depth in a first position for shipping, and a second depth in a second position for display.

Each of the first and second extension flaps can include a respective first panel and respective second panel. The second panel can be connected to the first panel at a respective fold line. A width of the first panel of the extension flap can be greater than a width of the first side panel and greater than a width of the second side panel. The first panel of each extension flap can be connected to the front panel at a respective fold line. The first and second side panels can be connected to the back panel at respective fold lines. The bottom panel can be connected to the front panel at a first bottom panel fold line and connected to the back panel at a second bottom panel fold line. The top panel can be connected to an adhesive flap at a respective fold line. At least one of the first side panel or the second side panel can be connected to a respective side flap at a respective fold line.

In accordance with another aspect, a method of forming a package from a blank includes forming a plurality of panels and first and second extension flaps from a single blank. The plurality of panels includes a front panel, a back panel, a first side panel, a top panel, a bottom panel and a second side panel. The method includes folding the front panel over the back panel. The plurality of panels and the at least one extension flap are integrally connected to each other along at least one fold line.

The method can include adhering an adhesive flap to the front panel. The method can include erecting the package by folding the adhesive flap with respect to a fold line between the adhesive flap and the top panel and by folding the front panel with respect to at least one of the first or second side panels along a respective fold line to generate an interior space to receive at least one product. The method can include overlapping at least one of the first or second extension flaps over an exterior surface of the front panel by folding at least one of the first or second extension flaps along a respective fold line.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
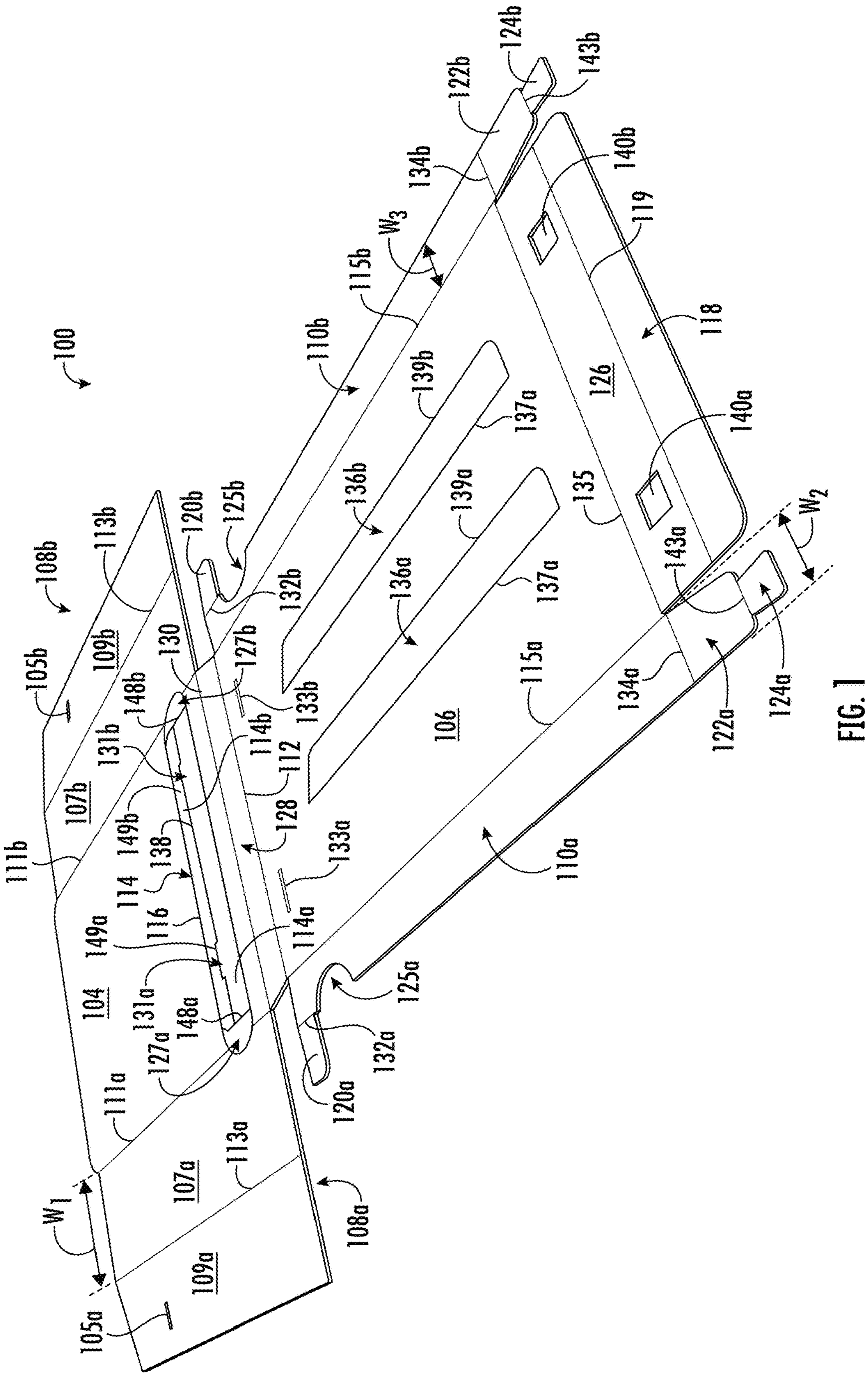
FIG. 1 is a perspective view of an exemplary embodiment of a package blank constructed in accordance with the present disclosure, showing the panels for the blank and the extension flaps.

Reference will now be made to the drawings wherein like reference numerals identify similar structural features or aspects of the subject disclosure. For purposes of explanation and illustration, and not limitation, a perspective view of an exemplary embodiment of a blank for a package in accordance with the disclosure is shown in FIG. 1 and is designated generally by reference character 100. Other embodiments of blanks and packages in accordance with the disclosure, or aspects thereof, are provided in FIGS. 2-19, as will be described. The systems and methods described herein can be used to provide one-piece graphic display packaging for shipping and displaying product, e.g., in a retail setting.

As shown in FIG. 1, a blank 100 for a package/container 102 (shown in FIGS. 13-14) includes a plurality of panels (104, 106, 110*a*, 110*b*, 126 and 128) connected together at respective fold lines configured for extending at least partially around an interior space. The plurality of panels includes a front panel 104, a back panel 106, a first side panel 110*a*, a top panel 126, a second side panel 110*b* and a bottom panel 128. The blank 100 includes first and second extension flaps 108*a* and 108*b*, respectively, connected to the front panel 104 at respective fold lines 111*a* and 111*b*. The plurality of panels (e.g. 104, 106, 110*a*, 110*b*, 126, 128, and other extensions/flaps connected thereto) and the first and second extension flaps 108*a* and 108*b* are integrally formed as a single blank 100.

With continued reference to FIG. 1, each of the first and second extension flaps 108*a* and 108*b*, respectively, include a first panel 107*a*, 107*b* and a second panel 109*a*, 109*b*. The second panels 109*a* and 109*b* are connected to their respective first panels 107*a* and 107*b* at respective fold lines 113*a* and 113*b*. Each second panel 109*a* and 109*b* includes respective cut outs 105*a* and 105*b*. Cut outs 105*a* and 105*b* are configured to engage with a display, rack or other mounting apparatus in the second position, described in more detail below. A width $W_1$ of the first panel 107*a* of the extension flap 108*a* can be greater than a width $W_2$ of the first side panel 110*a* and greater than a width $W_3$ of the second side panel 110*b*. In the embodiment shown in FIG. 1, $W_2$ and $W_3$ are substantially similar to one another. The first panels 107*a*, 107*b* of each extension flap 108*a*, 108*b* are connected to the front panel 104 at respective fold lines 111*a* and 111*b*.

As shown in FIG. 1, the first and second side panels 110*a* and 110*b*, respectively, are connected to the back panel 106 at respective fold lines 115*a*, 115*b*. The first and second side panels 110*a* and 110*b* each include a respective cut out 125*a* and 125*b* that permit easier access to the product stored within the interior of the package 102. The bottom panel 128 is connected to the front panel 104 at a first bottom panel fold line 130 and connected to the back panel 106 at a second bottom panel fold line 112. Back panel 106 is connected to the top panel 126 at a respective fold line 135. The top panel 126 is connected to an adhesive flap 118 at a respective fold line 119. First side panel 110*a* is connected to a respective side flap 120*a* at a respective fold line 132*a*. The second side panel 110*b* is connected to a respective side flap 120*b* at a respective fold line 132*b*. First side panel 110*a* is connected to a respective top flap 122*a* at a respective fold line 134*a*. The second side panel 110*b* is connected to a respective side flap 122*b* at a respective fold line 134*b*. Each respective side flap 122*a* and 122*b* includes a respective securing tab 124*a* and 124*b* connected thereto at respective fold lines 143*a* and 143*b*.

With reference now to FIG. 1, front panel includes a seat portion 114 having a line of weakness/break line 116. Seat portion 114 includes two panels 114*a* and 114*b* connected at a fold line 138 and extending from a first edge 148*a* to a second edge 148*b*. Panel 114*a* includes two securing tabs 131*a* and 131*b*. Securing tabs 131*a* and 131*b* are severable from panel 114*b* such that when panel 114*a* is folded with respect to 114*b* about fold line 138, the securing tabs 131*a* and 131*b* project into an interior space of the package and engage with corresponding slots 133*a* and 133*b* on back panel 106. Seat portion 114 includes cut outs 127*a* and 127*b* arranged opposite from one another. Cut outs 127*a* and 127*b* include a cut out of a portion of panels 107*a* and 107*b*. Cut outs 127*a* and 127*b* can be cut from the blank 100 initially or can be formed by breaking one or more break lines/lines of weakness after manufacturing the blank. Back panel 106 includes divider flaps 136*a* and 136*b*. Divider flaps 136*a* and 136*b* are connected to back panel 106 via respective fold lines 137*a* and 137*b* and lines of weakness, e.g. break lines, cut lines, or perforation lines, 139*a* and 139*b*. The dividers 136*a* and 136*b* (in this two dividers to create three sections) keep the product from catching on each other as they gravity feed within the package 102 toward the seat portion 114. The number of dividers required depends on the number of facings of product the display holds. Having these die cut out of the back panel 106 when forming the blank 100 eliminates the need for external dividers having to be added to the package 102. While shown and described above with divider flaps 136*a* and 136*b*, it will be readily appreciated by one skilled in the art that any suitable number of divider flaps can be used. Top panel 126 includes cut outs 140*a* and 140*b* configured to receive respective securing tabs 124*a* and 124*b* when package 102 is erected.

As shown in FIGS. 2-14 blank 100 forms a package 102 that can be used for storing product during shipping and displaying product at a retail location. As shown in FIG. 1, a method of forming a package from the blank 100 includes forming the plurality of panels (e.g. 104, 106, 110*a*, 110*b*, 126, 128, and other extensions/flaps connected thereto) and the first and second extension flaps 108*a* and 108*b* from a single blank 100. Forming package 102 includes folding the front panel 104 and the bottom panel 128 about the second bottom panel fold line 112 toward an interior surface 117 of back panel 106. An interior surface 123 of adhesive flap 118 abuts an interior surface 121 of front panel 104. Adhesive flap 118 is adhered to the interior surface 121 of the front panel 104.

Figure 2:
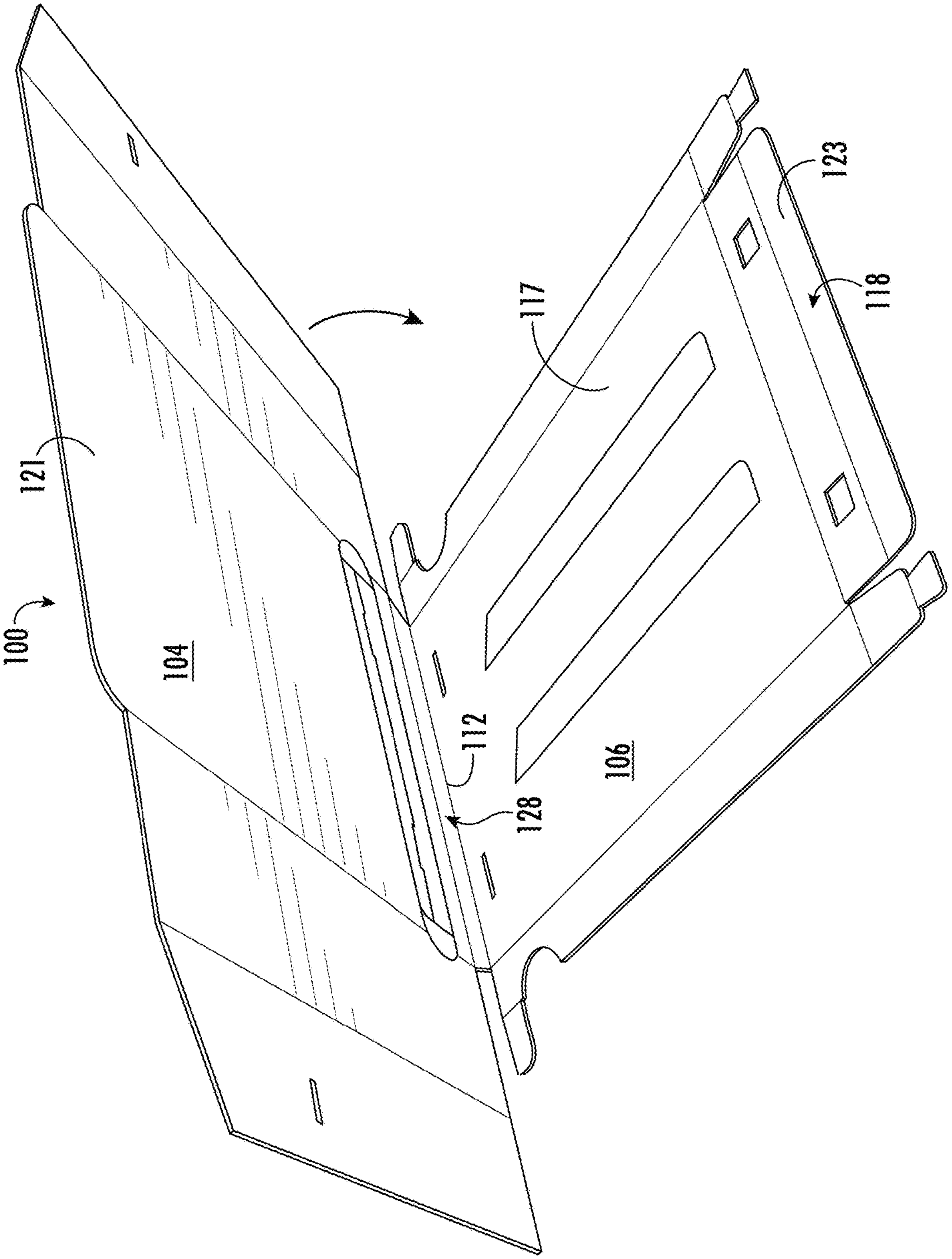
FIGS. 2-14 are perspective views of the blank of FIG. 1, showing stages of preparing the blank into a package for packaging and shipping product.
Figure 3:
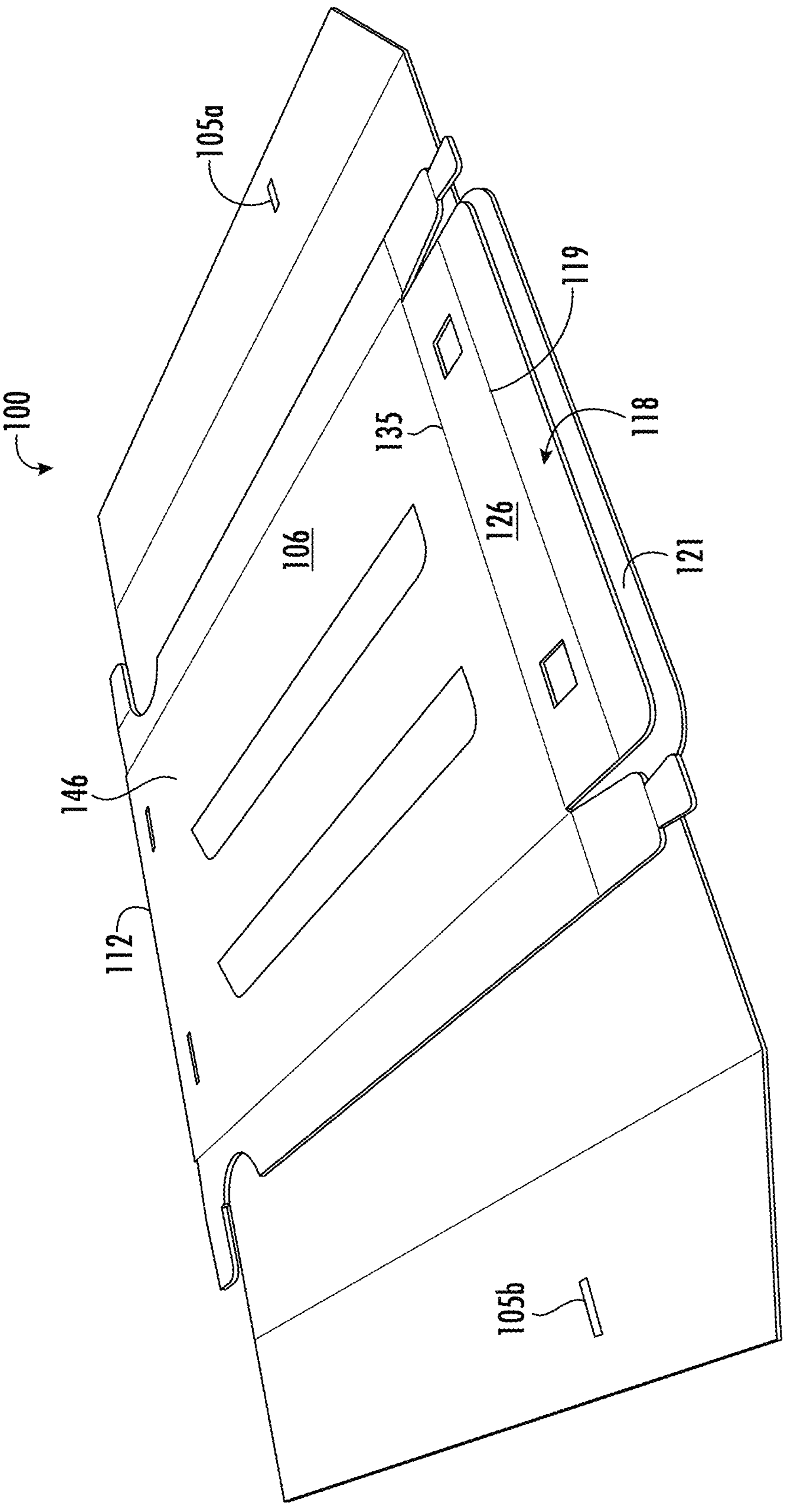
Figure 4:
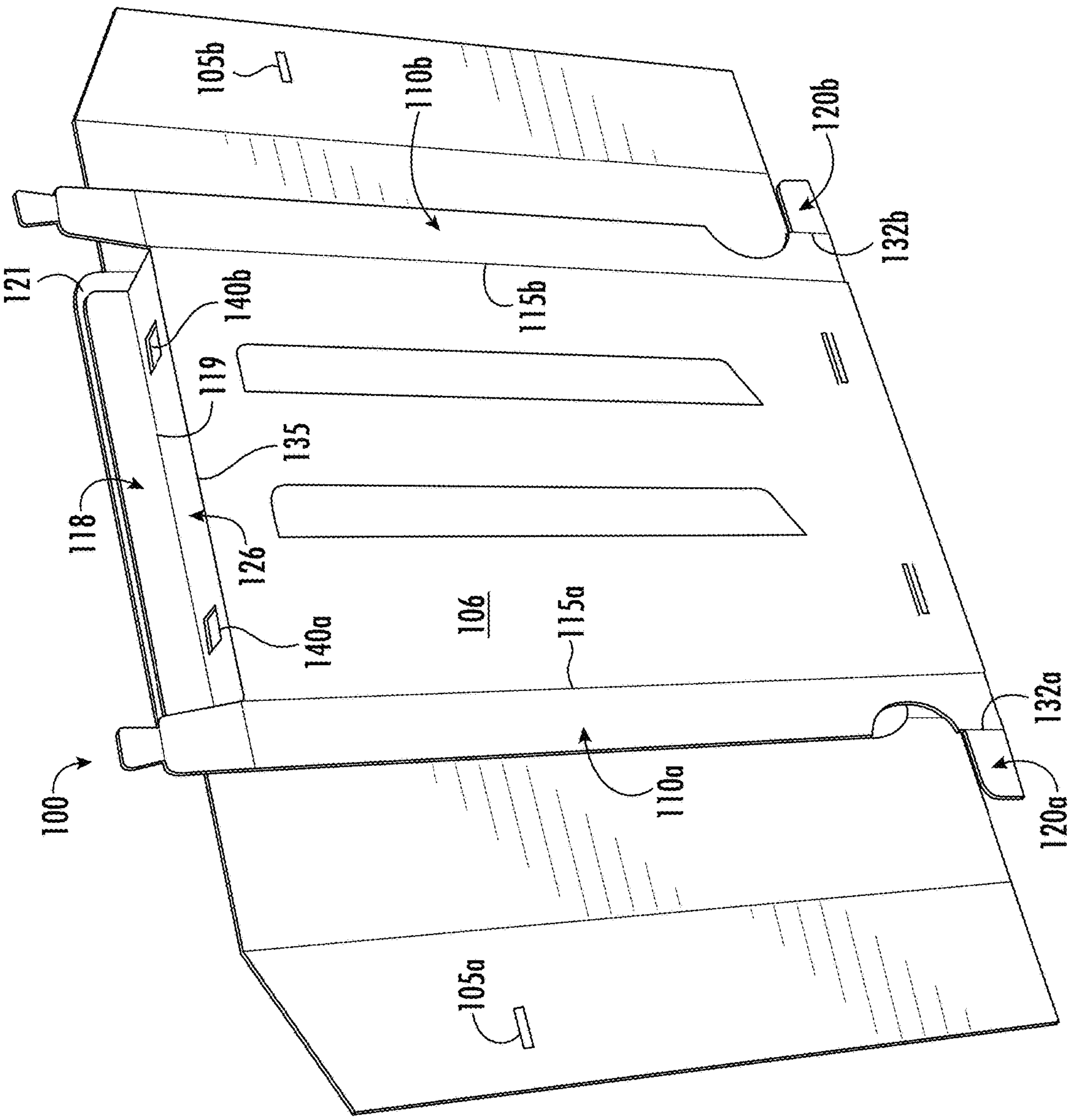
Figure 5:
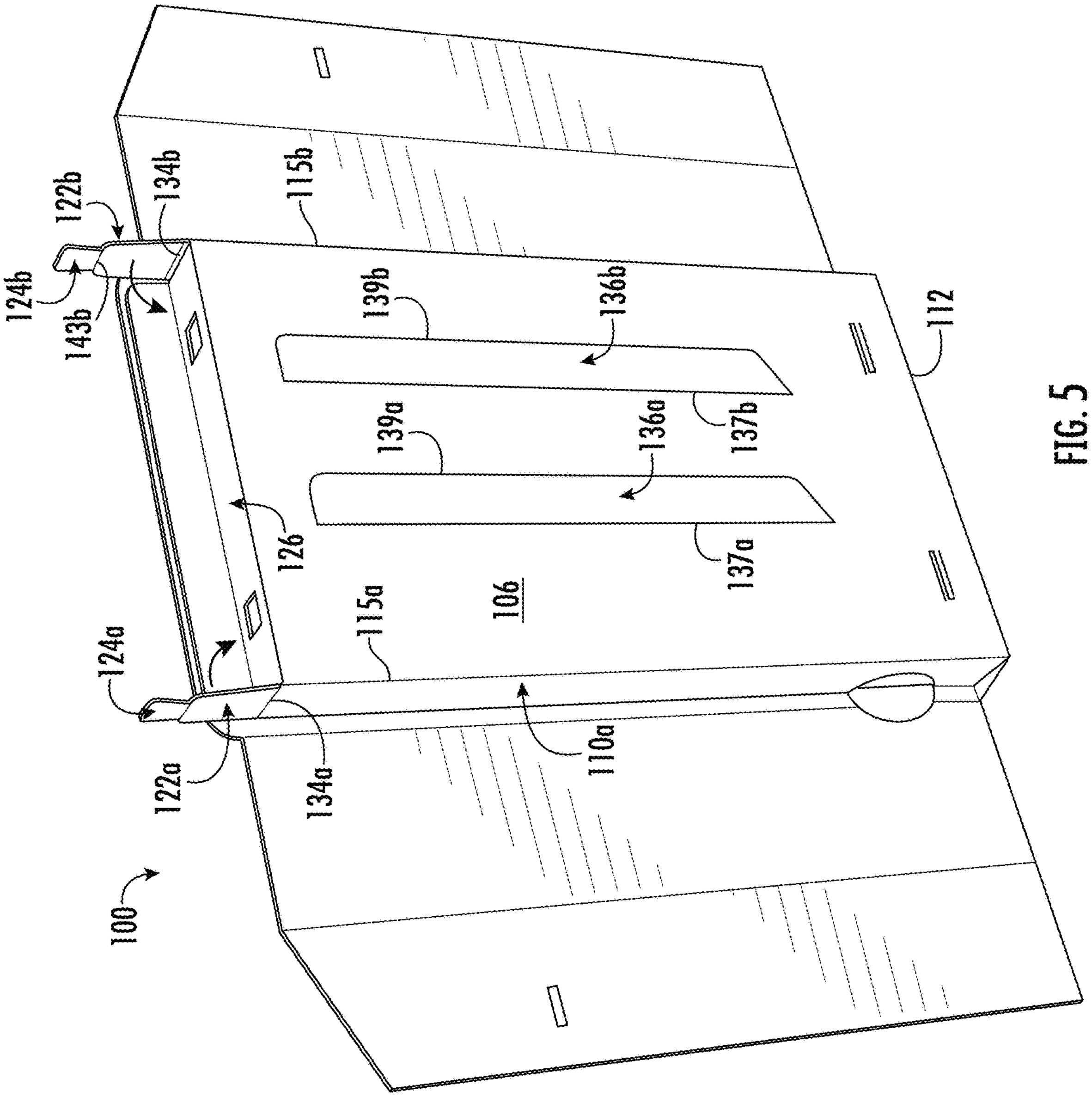
Figure 6:
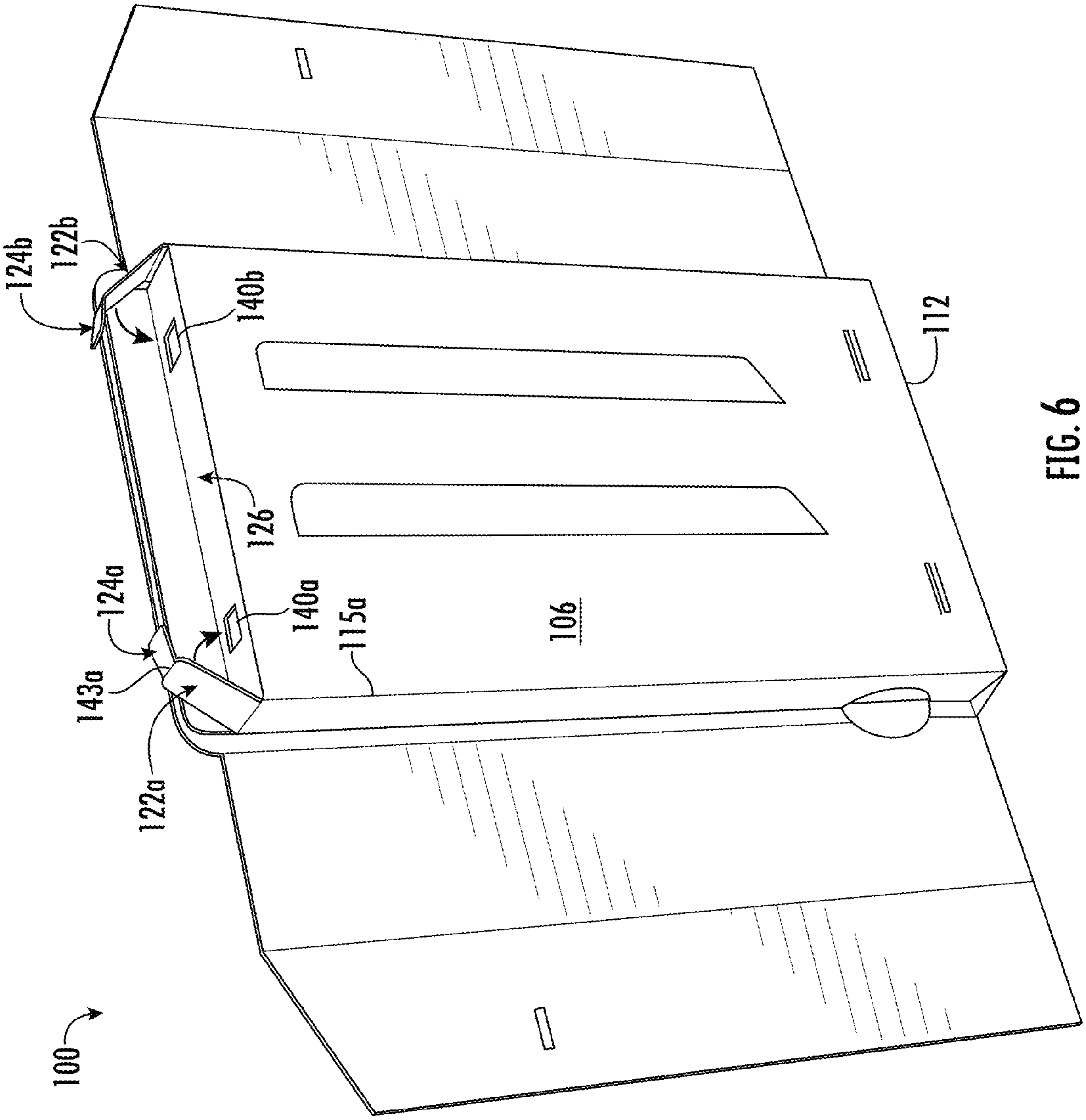
Figure 7:
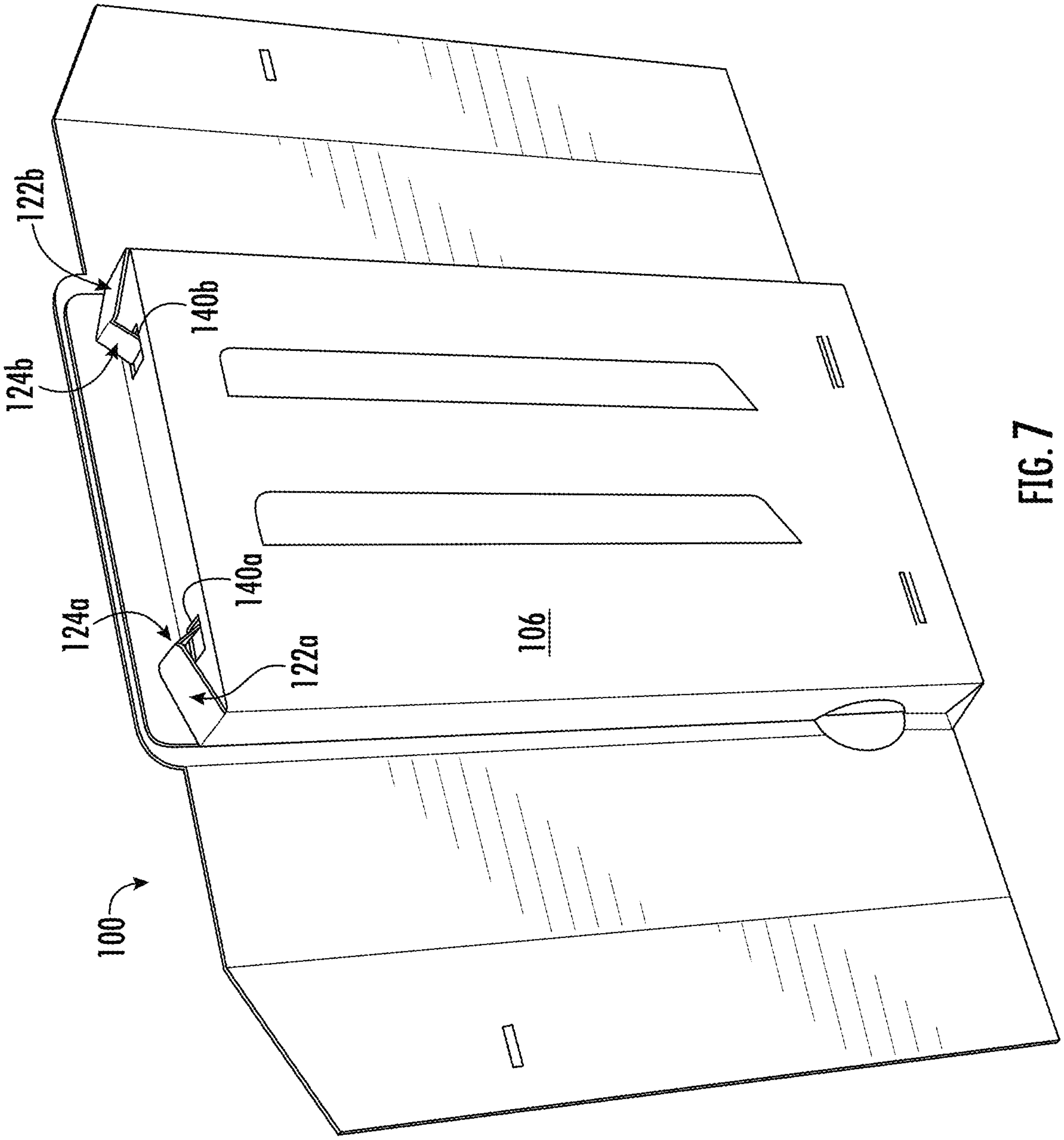

FIG. 3 shows the blank 100 in a folded position from an opposite side of that shown in FIG. 2, e.g. from an exterior surface 146 of back panel 106. As shown in FIGS. 3-4, the method includes erecting the blank 100 into package 102 to a first position by folding top panel 126 with respect to adhesive flap 118 about fold line 119 and folding the top panel 126 with respect to back panel 106 about fold line 135.

As shown in FIGS. 3-4, side panels 110*a* and 110*b* are folded inward toward front panel 104 about respective fold lines 115*a* and 115*b*. Before, after or concurrently therewith bottom panel 128, not visible in FIGS. 3 and 4, is folded with respect to the back panel 106 about the second bottom panel fold line 112. Additionally, side flaps 120*a* and 120*b* are folded about respective fold lines 132*a* and 132*b* inward toward front panel 104. First side panel 110*a* is connected to a respective side flap 120*a* at respective fold line 132*a*. The second side panel 110*b* is connected to a respective side flap 120*b* at respective fold line 132*b*. After the front panel 104, back panel 106, side panels 110*a* and 110*b*, top panel 126 and bottom panel 128 are folded with respect to one another, they are erected to form a generally rectangular volume, e.g. interior space, for storing product for shipping. The divider flaps 136*a* and 136*b* are at least partially broken away from back panel 106 via lines of weakness 139*a* and 139*b* and are folded back about respective fold lines 137*a* and 137*b* toward the interior surface 121 of the front panel 104.

Figure 8:
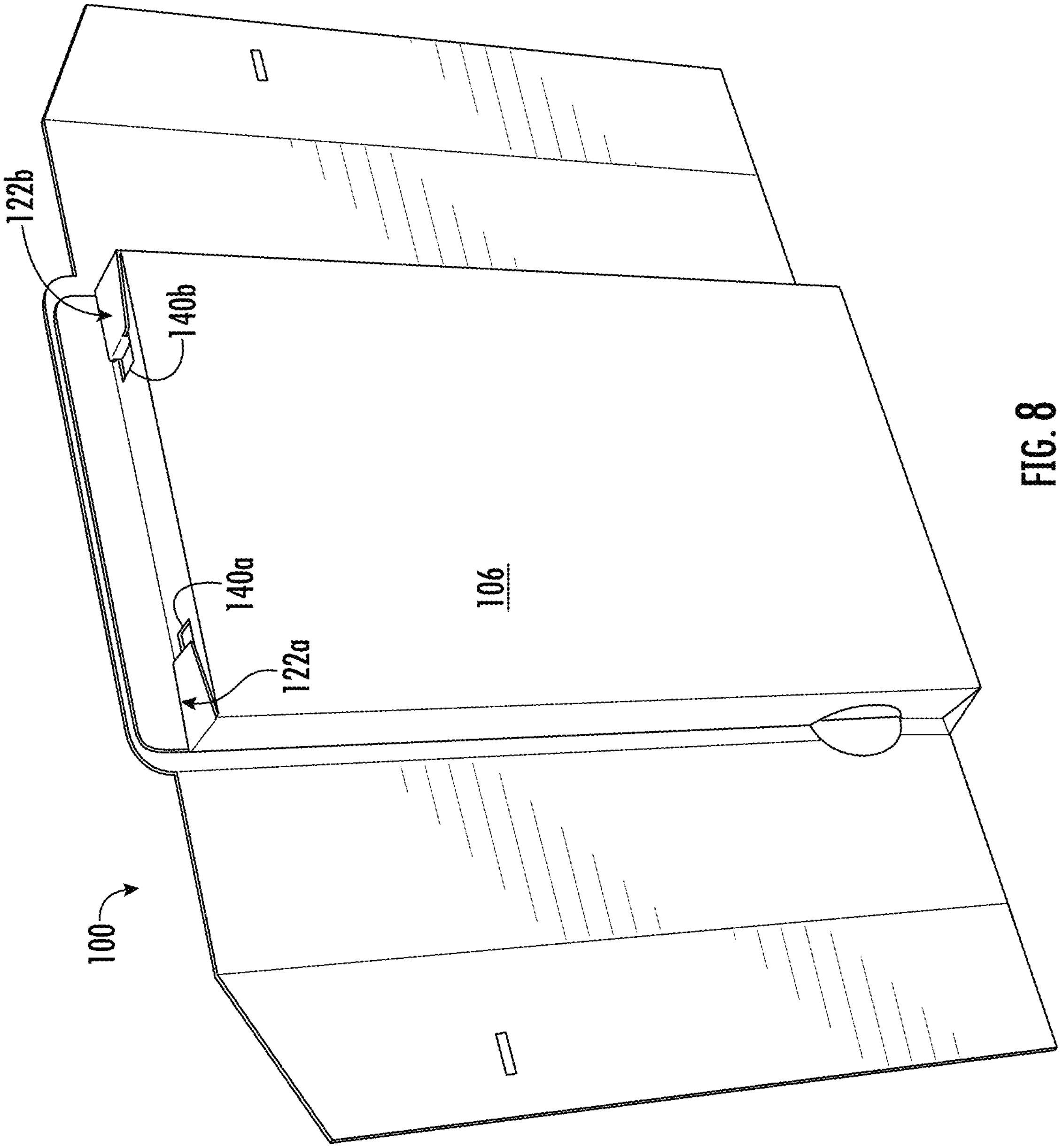

As shown schematically in FIGS. 5-8 by arrows, top flaps 122*a* and 122*b* are folded downward toward top panel 126 about respective fold lines 134*a* and 134*b*. Securing tab 124*a* is folded with respect to top flap 122*a* about fold line 143*a* toward top panel 126 to engage with cut out 140*a*. Securing tab 124*b* is folded with respect to top flap 122*b* about fold line 143*b* toward top panel 126 to engage with cut out 140*b*. FIG. 8 shows top flaps 122*a* and 122*b* secured into respective cut outs 140*a* and 140*b*.

Figure 9:
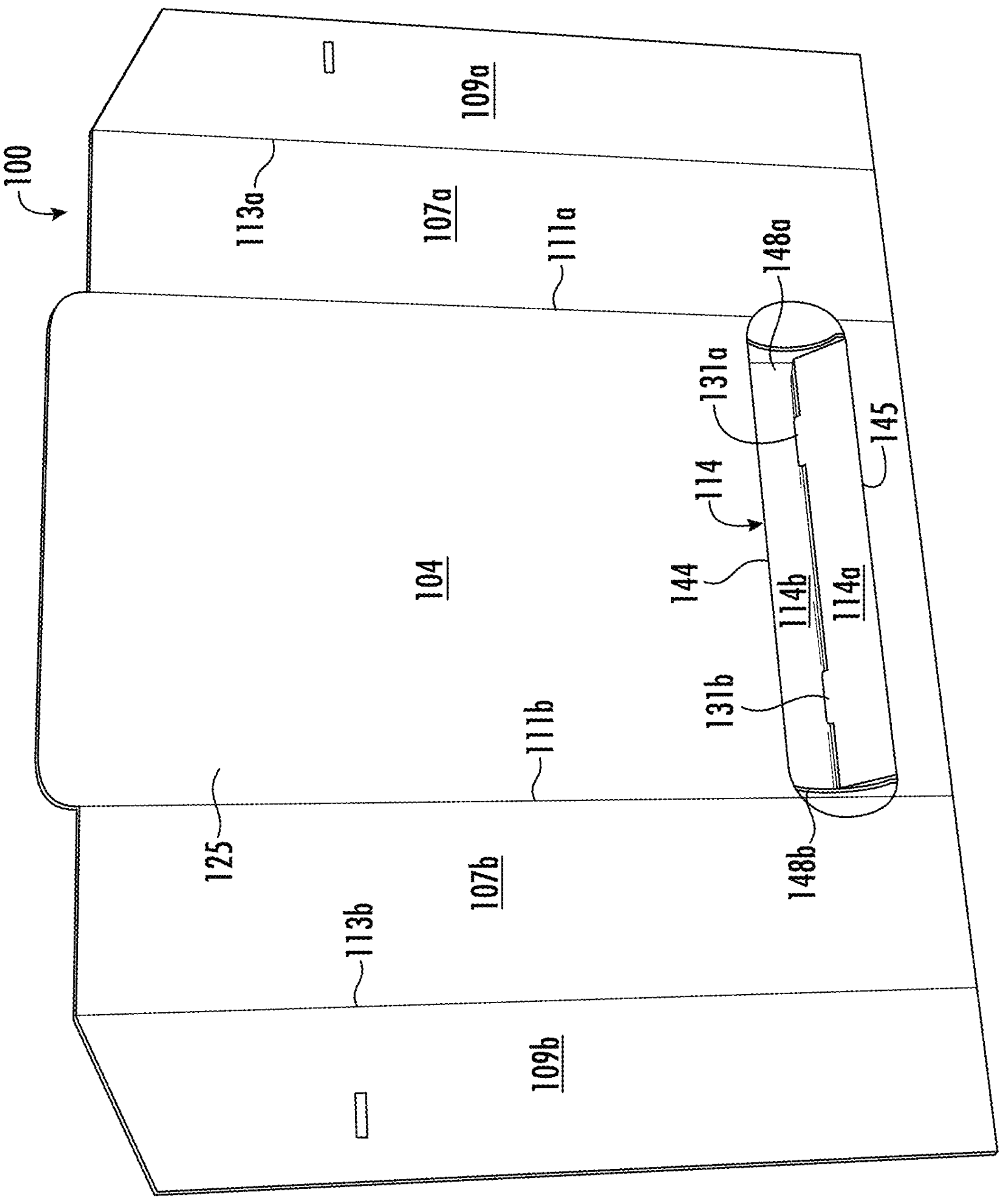
Figure 10:
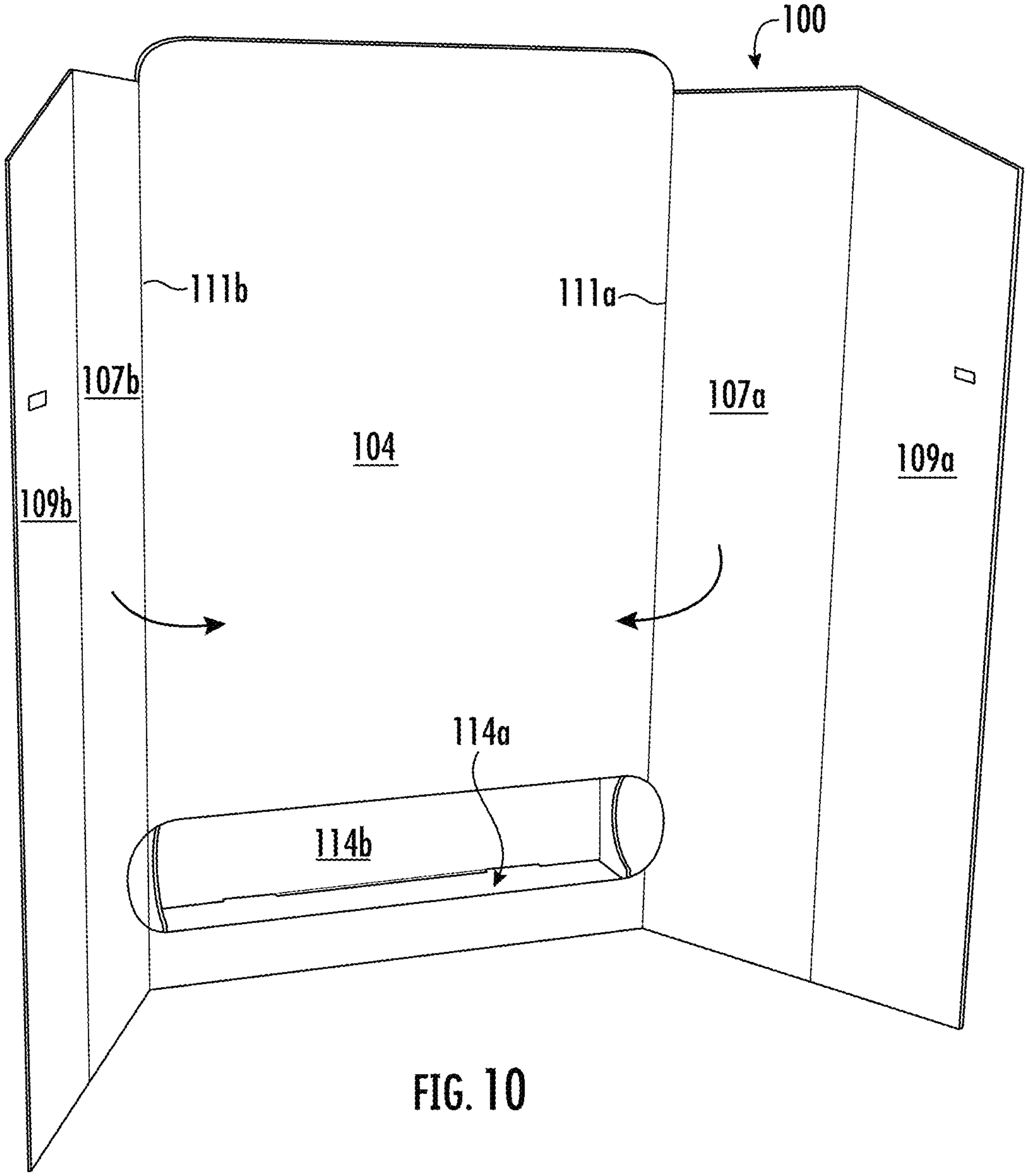
Figure 11:
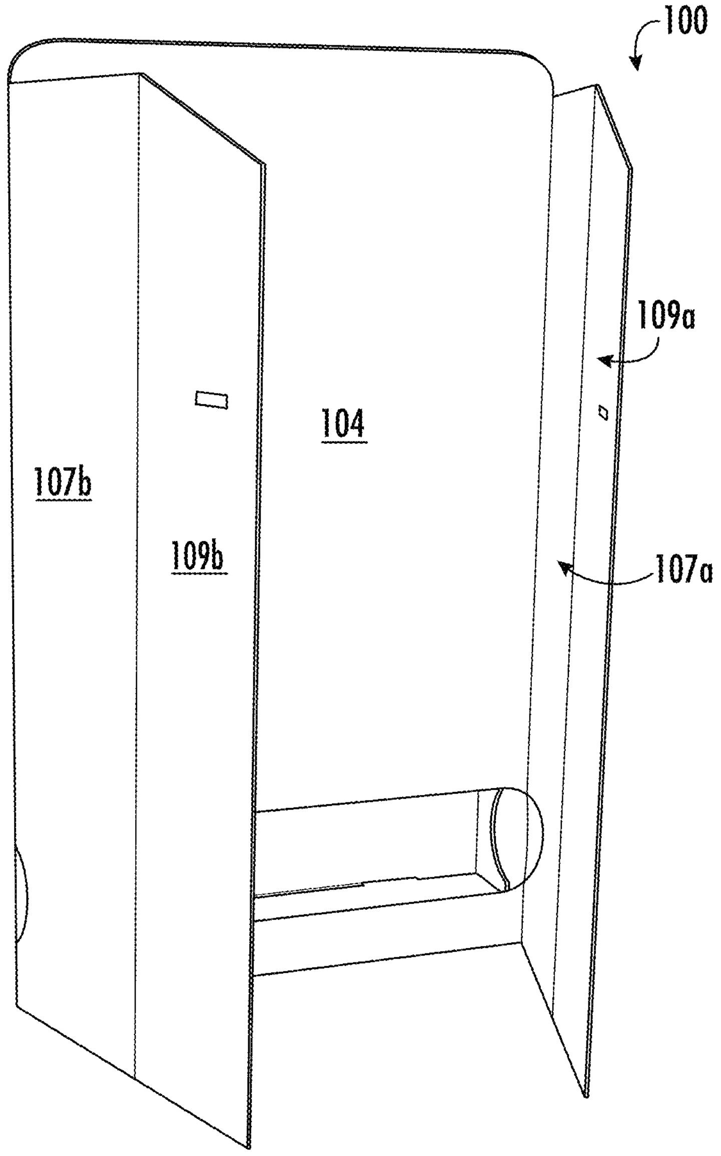
Figure 12:
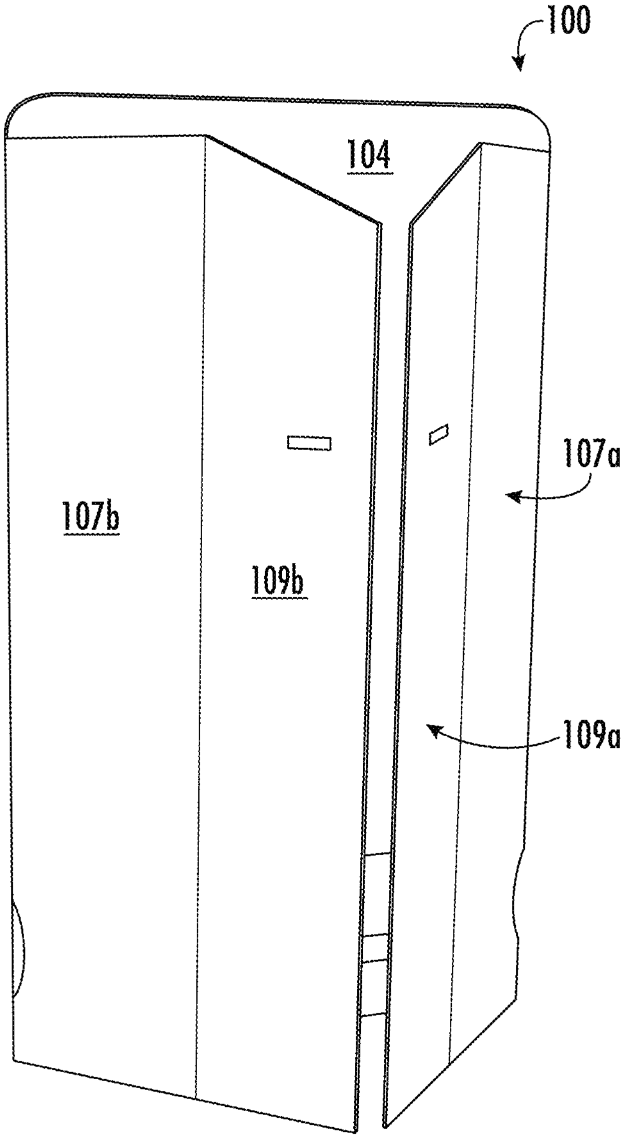
Figure 13:
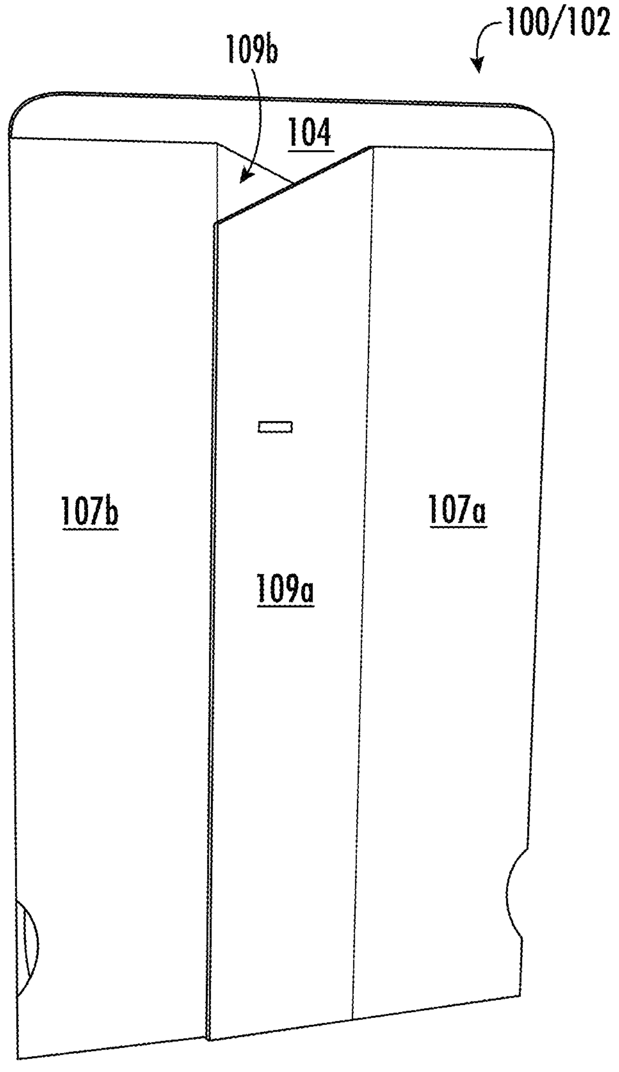

As shown in FIGS. 1 and 9-10, once securing tabs 124*a* and 124*b* are in place, the line of weakness 116, e.g. break line, perforation line, or the like, on seat portion 114 can be broken to allow panel 114*a* of seat portion 114 and panel 114*b* of seat portion to fold with respect to one another about fold line 138. After line of weakness, or break line, 116 is broken, an edge 144 is formed and seat portion 114 becomes a flap foldable with respect to front panel 104 at fold line 145. In some embodiments, line of weakness 116 includes a cut line, where no breaking before folding 114*a* and 114*b* would be required. When 114*a* and 114*b* are folded with respect to one another, securing tabs 131*a* and 131*b* are broken from panel 114*b* along respective lines of weakness 149*a* and 149*b* (which can include three sides of each tab 131*a* and 131*b*). When panel 114*a* is folded with respect to panel 114*b* about fold line 138, the securing tabs 131*a* and 131*b* each project into the interior space of the package 102 and engage with corresponding slots 133*a* and 133*b* on back panel 106 to secure seat 114 in place. In some embodiments, line of weakness 149*a* and 149*b* include a cut line, where no breaking before/during folding 114*a* and 114*b* would be required. Once folded, panel 114*a* and 114*b* are at approximately ninety degrees with respect to one another. Once seat portion 114 is in place, the product can be slid in from the front panel 104 via seat portion 114

Figure 14:
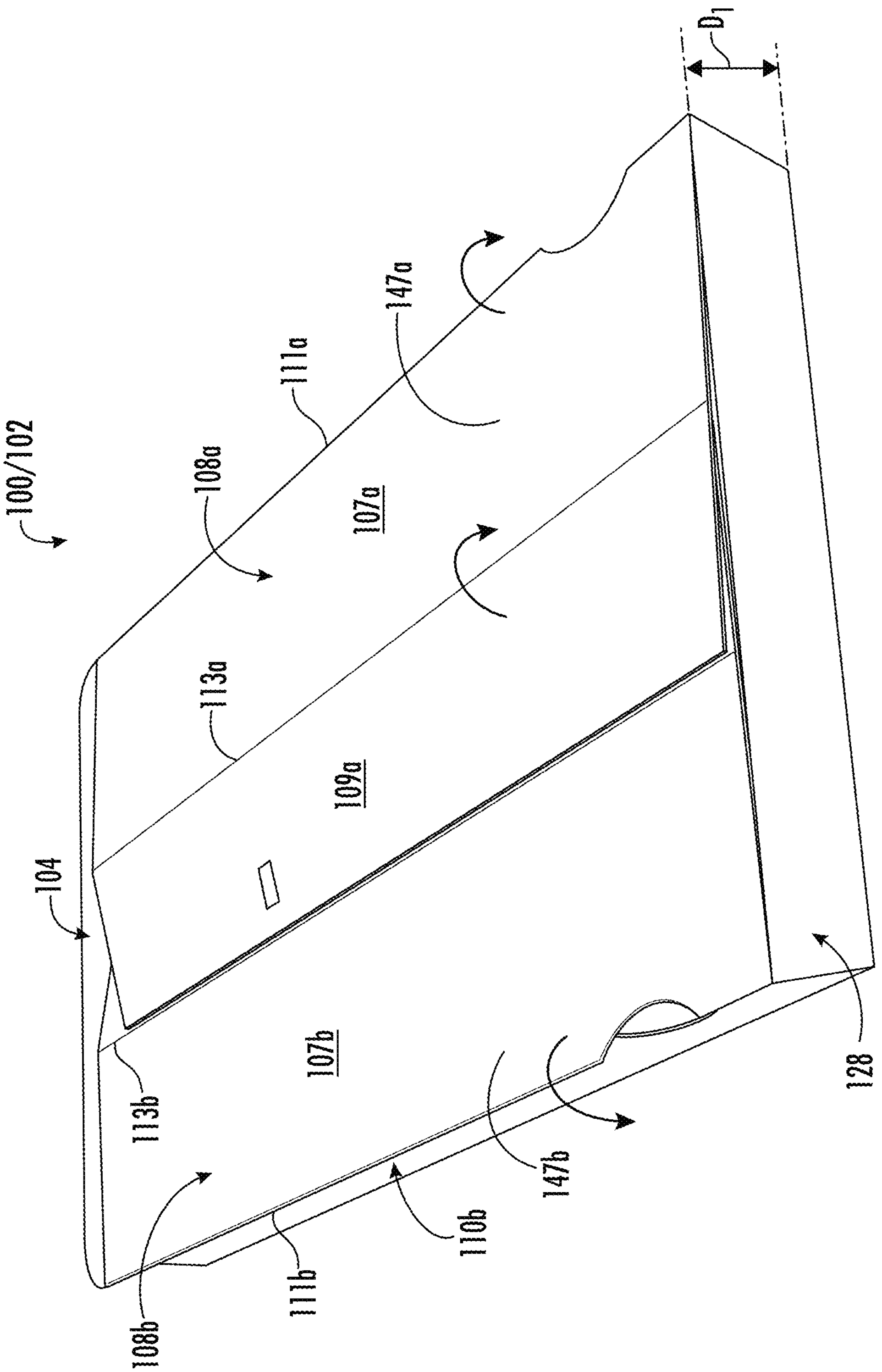

As shown in FIGS. 10-14, the display package 102 is then converted into a first position with first depth $D_1$ for shipping. To convert the package 102 for shipping, first and second extension flaps 108*a* and 108*b* are folded about respective fold lines 111*a* and 111*b* toward the front panel 104 to overlap an exterior surface of the front panel 104. The exterior surface of front panel 104 abuts the interior surface of extension flap 108*a* and a portion of an interior surface of extension flap 108*b*. The first and second panels 107*a* and 109*a* of first extension panel 108*a* remain relatively planar with respect to one another, as do first and second panels 107*b* and 109*b* of second extension panel 108*b*. As shown in FIG. 14, the first depth $D_1$ is defined in a direction perpendicular to the front panel 104, between exterior surface 146 of back panel 106 and an exterior surface 147*a* of first extension flap 108*a* or an exterior surface 147*b* of second extension flap 108*b*, depending on which side of the package the first depth $D_1$ is measured.

Figure 15:
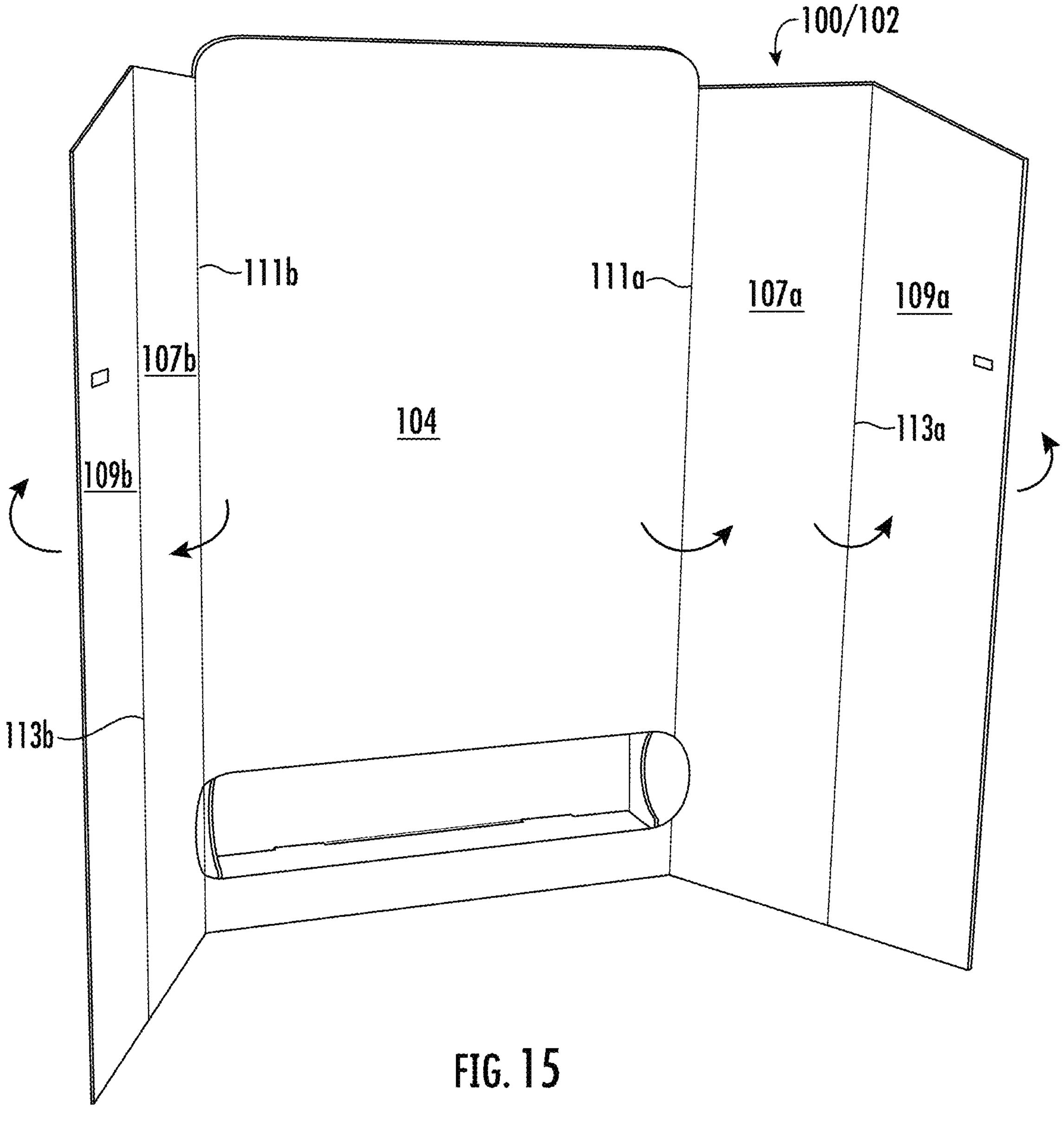
FIG. 15 is a perspective view of the package of FIG. 1, showing the extension panels being folded back for retail display.
Figure 16:
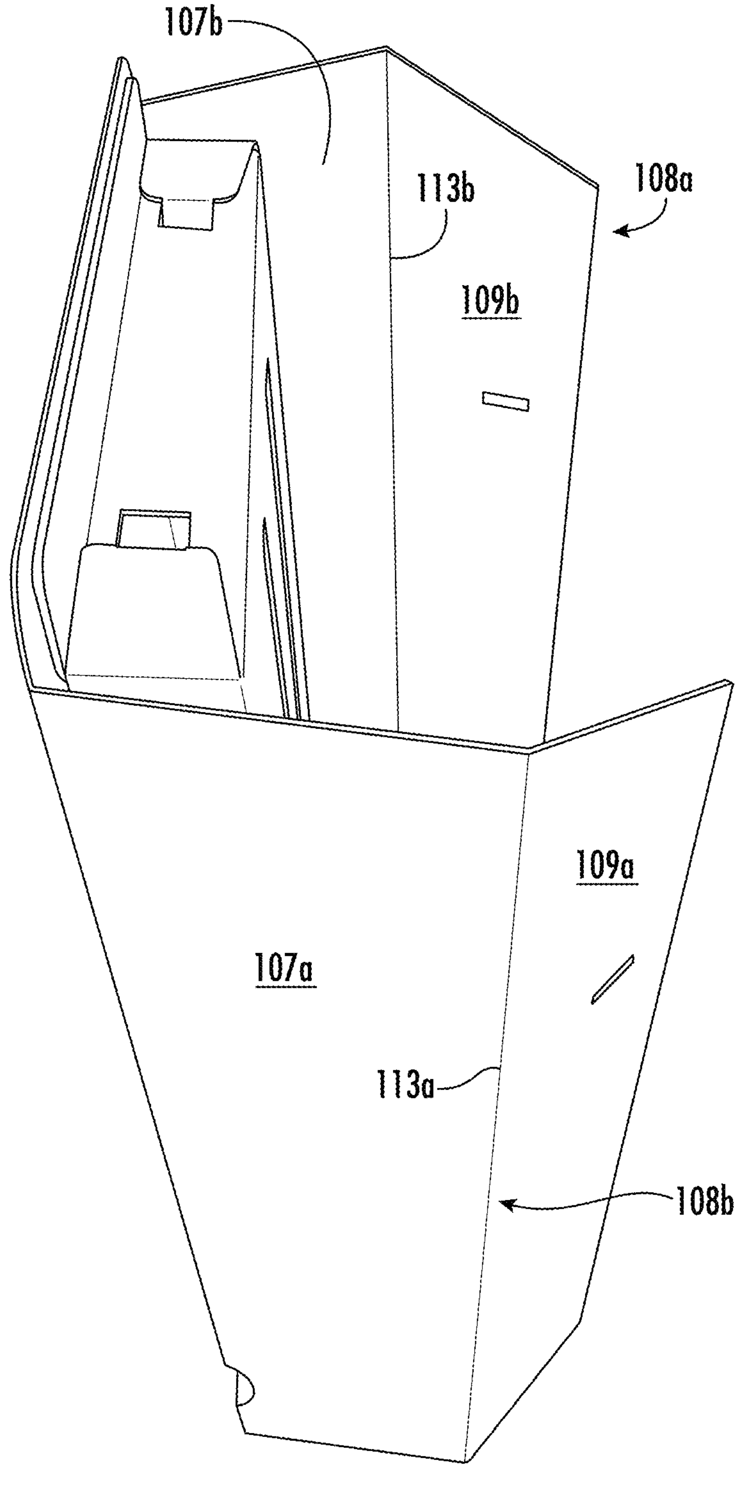
FIG. 16 is a photograph of a package constructed in accordance with the present disclosure from top side, showing the extension panels being folded back for retail display.
Figure 17:
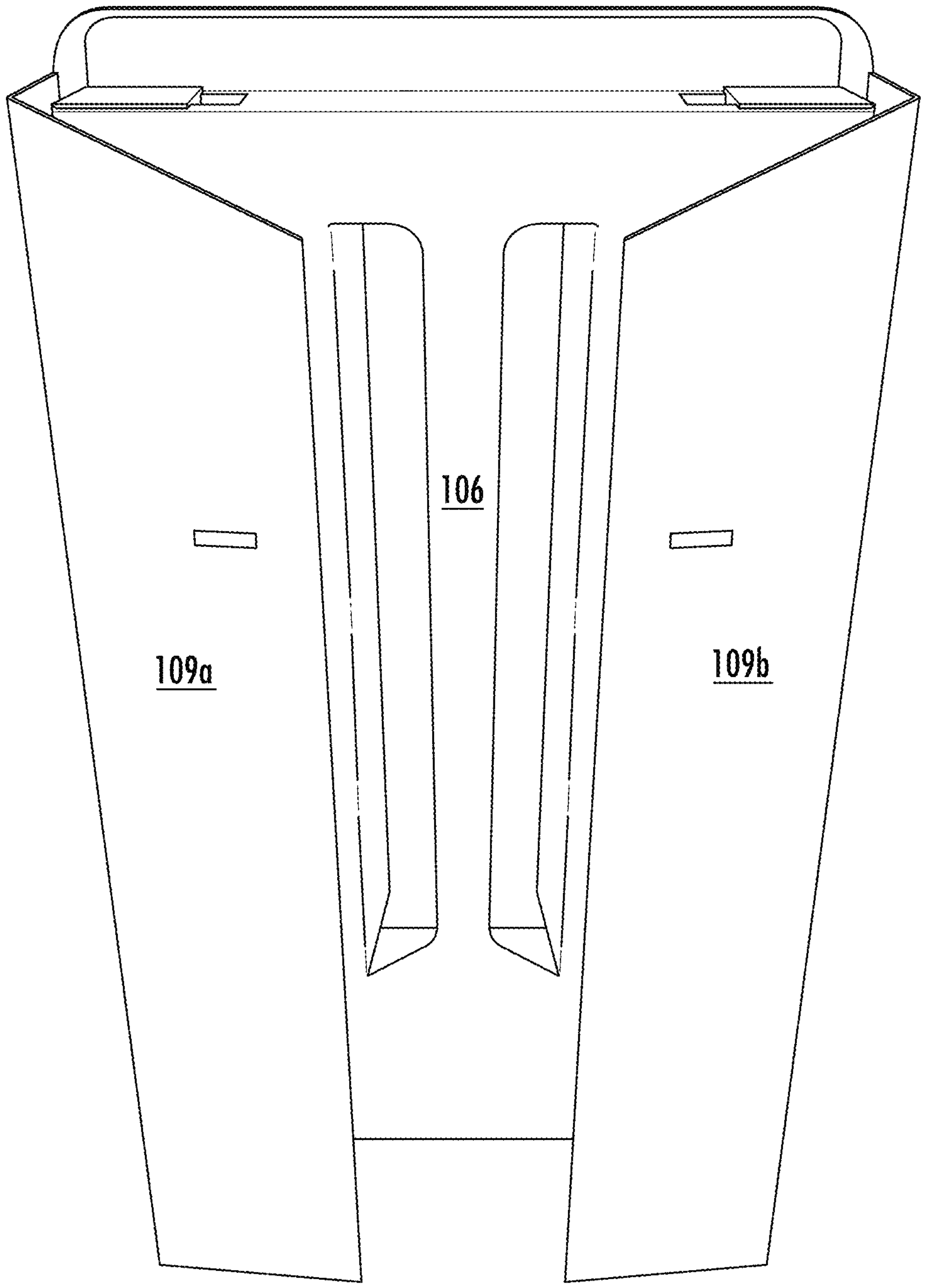
FIG. 17 is a photograph of the package of FIG. 16 from the back, showing the extension panels fully folded back in a position similar to where they would be when mounted on a retail display.
Figure 18:
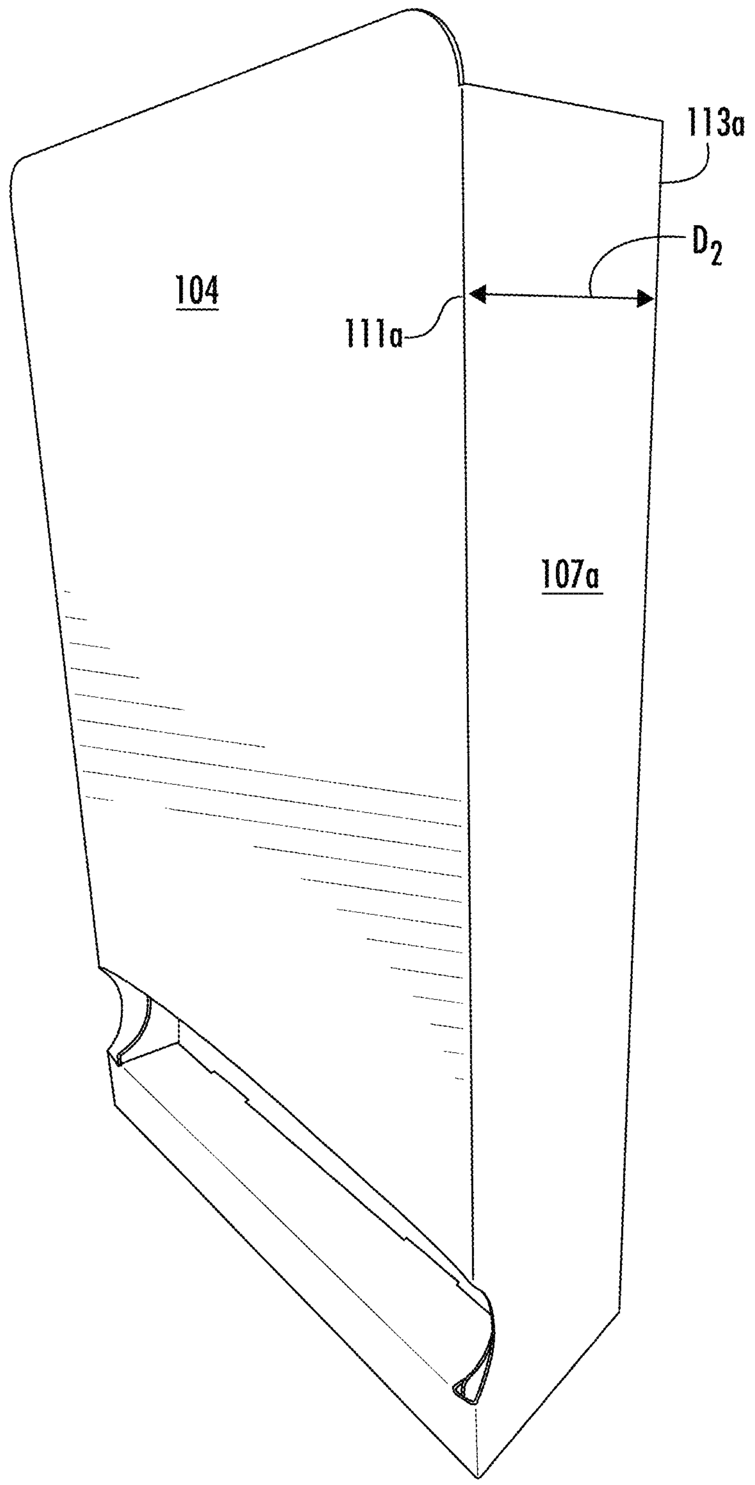
FIG. 18 is a photograph of the package of FIG. 16 from a side perspective view, showing the extension panels fully folded back and schematically showing the second depth.

As shown in FIGS. 15-18, the plurality of panels 104, 106, 110*a*, 110*b*, 126 and 128, and the first and second extension flaps 108*a* and 108*b* define a second depth $D_2$ in a second position for display. To convert from the first position, as shown in FIG. 14, to a second position, as shown in FIGS. 17 and 18, each of the extension panels 108*a* and 108*b* are folded with respect to front panel 104 about their respective fold lines 111*a* and 111*b*. The folding is shown in FIGS. 15-16. Second panels 109*a* and 109*b* are folded with respect to their respective first panels 107*a* and 107*b* about respective fold lines 113*a* and 113*b*. This folding is schematically indicated by arrows proximate to the fold lines in FIG. 14-15. Because the width $W_1$ of each of first and second panels 107*a* and 107*b* is greater than the width $W_2$ of the first side panel 110*a* and greater than the width $W_3$ of the second side panel, when folded backward, package 102 has second depth $D_2$. For a given side of package 102, second depth $D_2$ is defined from a corner between the front panel 104 and the first panels 107*a* or 107*b* and a corresponding respective corner between the first panels 107*a* or 107*b* and the back surface of panels 109*a* and/or 109*b*. For example, $D_2$ of FIG. 18 is shown defined between a corner along fold line 111*a* and a corner along fold line 113*a* in a direction perpendicular to the front panel 104. Depending on the angle of panels 107*a* and 107*b* relative to front panel 104, $D_2$ can be equal to the width of panels 107*a* and/or 107*b*.

Figure 19:
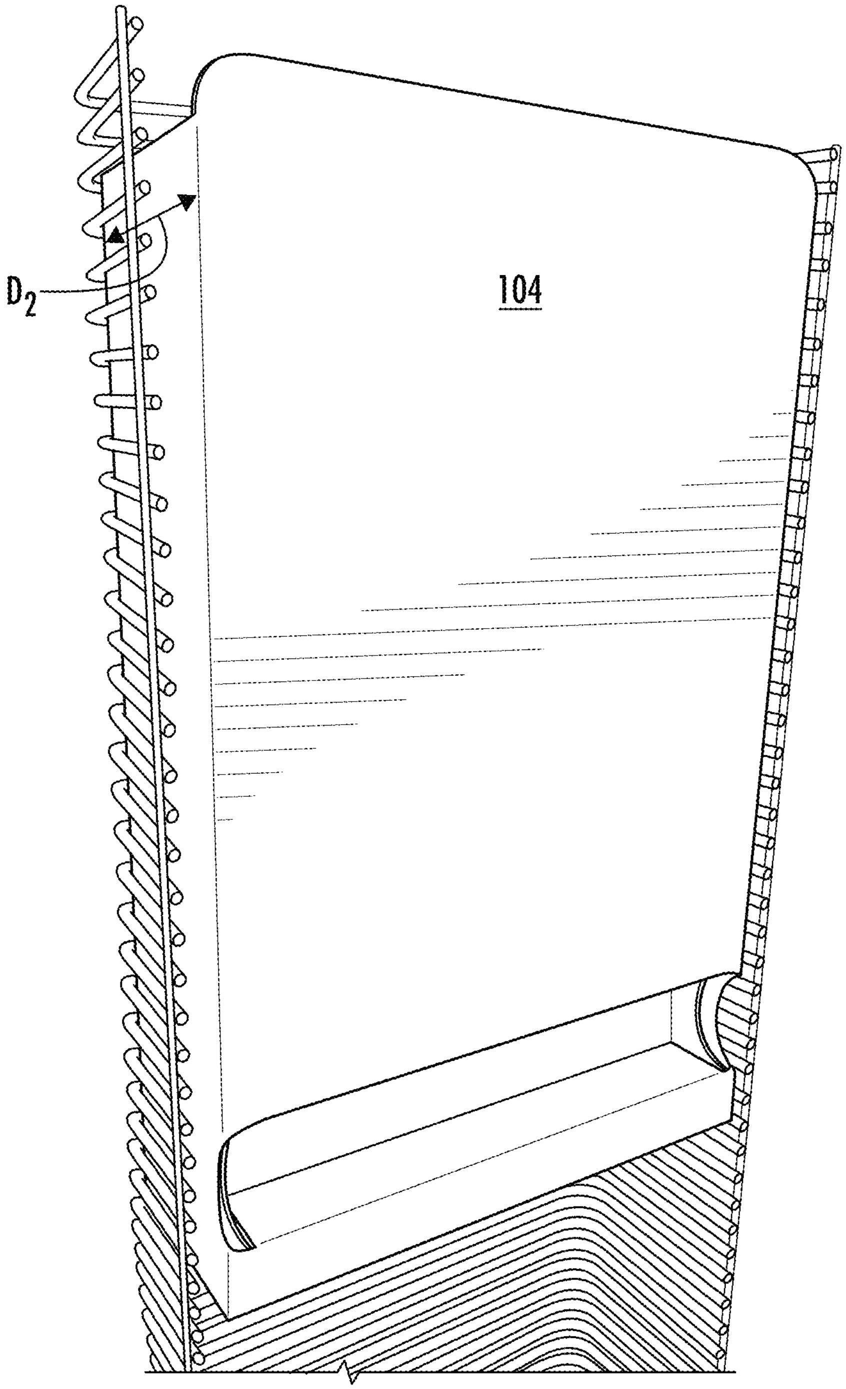
FIG. 19 is a photograph of the package of FIG. 16 from a front perspective view, showing the extension panels fully folded back with the package mounted on a wire rack for retail display.

As shown in FIGS. 18-19, in the second position, extension flaps 108*a* and 108*b* can engage with a display base or rack to mount package 102 for gravity fed distribution of one or more products. Embodiments of blank 100 and package 102 provide for a quick set-up and have a reduced overall depth for shipping as compared to traditional packages, while still being able to be mounted to a display and/or rack for retail use.

The methods and systems of the present disclosure, as described above and shown in the drawings, provide for compact gravity fed packaging for use with a display system that is shipped with product having advantages over traditional packaging, such as compact shipping, efficient use of material, reduced machinery in manufacturing, and simplified assembly. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A package comprising:

a plurality of panels connected together at fold lines configured for extending at least partially around an interior space, including a front panel, a back panel, a first side panel, a second side panel and a bottom panel, wherein the interior space is configured to receive at least one product, wherein at least one of the first side panel or the second side panel includes a respective side flap foldably connected only to a portion of the respective first side panel or the second side panel and not the entire length of the respective first side panel or the second side panel and a first extension flap foldably connected to a first side of the front panel and a second extension flap foldably connected to a second side of the front panel, wherein the plurality of panels and the first and second extension flaps define a first depth in a first position for shipping, and a second depth in a second position for display, wherein the first extension flap includes a first panel and a second panel, the second panel of the first extension flap is foldably connected to the first panel of the first extension flap, wherein the second extension flap includes a first panel and a second panel, wherein the second panel of the second extension flap is foldably connected to the first panel of the second extension flap wherein, in the second position, the second panel of the first extension flap is folded relative to the first panel of the first extension flap towards the back panel, and the second panel of the second extension flap is folded relative to the first panel of the second extension flap towards the back panel, wherein the second panel of the first extension flap is spaced apart from the second panel of the second extension flap in the second position.

2. The package as recited in claim 1, wherein in the first position for shipping each of the first and second extension flaps are collapsed towards the front panel in a partial overlapping relationship with each other and folded back toward the back panel in the second position.

3. The package as recited in claim 1, wherein a width of the first panel of the extension flap is greater than a width the first side panel, and greater than a width of the second side panel.

4. The package as recited in claim 3, wherein the first panel of each extension flap is foldably connected to the front panel.

5. The package as recited in claim 1, wherein in the first position at least one of the extension flaps overlays an exterior surface of the front panel.

6. The package as recited in claim 1, wherein in the second position the first and second extension flaps are folded back with respect to the front panel.

7. The package as recited in claim 1, wherein the plurality of panels further comprise a top panel foldably connected to an adhesive flap.

8. The package as recited in claim 7, wherein the respective side flap includes a respective securing tab and the top panel includes a cutout configured to receive the respective securing tab when the package is erected.

9. The package as recited in claim 1 wherein in the first position for shipping each of the first and second extension flaps are collapsed towards the front panel such that each of the second panels of the respective first and the second extension flaps are bent towards the front panel.

10. A blank for a package comprising:

a plurality of panels connected together at respective fold lines, including a front panel, a back panel, a first side panel, a second side panel and a bottom panel, wherein at least one of the first side panel or the second side panel includes a respective side flap foldably connected at a respective fold line only to a portion of the first side panel or the second side panel and not an entire length of the first side panel or the second side panel; and first and second extension flaps connected to the front panel at respective fold lines, wherein the plurality of panels and the first and second extension flaps are configured to define a first depth in a first position for shipping, and a second depth in a second position for display, wherein the first extension flap includes a first panel and a second panel, the second panel of the first extension flap is configured to be foldably connected to the first panel of the first extension flap, wherein the second extension flap includes a first panel and a second panel, wherein the second panel of the second extension flap is configured to be foldably connected to the first panel of the second extension flap wherein, the second panel of the first extension flap is configured to be folded relative to the first panel of the first extension flap towards the back panel, and the second panel of the second extension flap is configured to be folded relative to the first panel of the second extension flap towards the back panel when the package is formed and wherein the back panel includes at least one divider flap connected to the back panel via a respective fold line and a line of weakness, wherein at least one divider flap is configured and adapted to be partially broken away from the back panel and folded back towards an interior surface of the front panel when the package is formed.

11. The blank as recited in claim 10, wherein each of the first and second extension flaps includes a respective first panel and respective second panel, wherein the second panel is connected to the first panel at a respective fold line, wherein a width of the first panel of the extension flap is greater than a width of the first side panel and greater than a width of the second side panel.

12. The blank as recited in claim 11, wherein the first panel of each extension flap is connected to the front panel at a respective fold line.

13. The blank as recited in claim 10, wherein the first and second side panels are connected to the back panel at respective fold lines.

14. The blank as recited in claim 10, wherein the bottom panel is connected to the front panel at a first bottom panel fold line and connected to the back panel at a second bottom panel fold line.

15. The blank as recited in claim 10, wherein the plurality of panels further comprise a top panel connected to an adhesive flap at a respective fold line.

16. The blank as recited in claim 15, wherein the respective side flap includes a respective securing tab and the top panel includes a cutout configured to receive the respective securing tab when the package is erected.

* * * * *